United States Patent
Tanida et al.

(10) Patent No.: US 8,531,596 B2
(45) Date of Patent: Sep. 10, 2013

(54) CAMERA APPARATUS AND ELECTRONIC DEVICE PROVIDED WITH THE SAME

(75) Inventors: Yoshinori Tanida, Osaka (JP); Fujio Tanaka, Osaka (JP); Katsuitsu Nishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 728 days.

(21) Appl. No.: 12/449,636

(22) PCT Filed: Feb. 5, 2008

(86) PCT No.: PCT/JP2008/051827
§ 371 (c)(1),
(2), (4) Date: Oct. 27, 2009

(87) PCT Pub. No.: WO2008/102637
PCT Pub. Date: Aug. 28, 2008

(65) Prior Publication Data
US 2010/0045855 A1     Feb. 25, 2010

(30) Foreign Application Priority Data
Feb. 19, 2007   (JP) .................................. 2007-038585

(51) Int. Cl.
*H04N 5/225*   (2006.01)

(52) U.S. Cl.
USPC ......................................... 348/376; 348/373

(58) Field of Classification Search
None
See application file for complete search history.

(56) References Cited

U.S. PATENT DOCUMENTS

| | | | |
|---|---|---|---|
| 7,468,850 B2 * | 12/2008 | Chang | 348/376 |
| 7,719,611 B2 * | 5/2010 | Wang et al. | 348/373 |
| 2002/0057468 A1 * | 5/2002 | Segawa et al. | 358/509 |
| 2002/0067924 A1 * | 6/2002 | Yamazaki et al. | 396/429 |
| 2003/0040346 A1 * | 2/2003 | Fukuda et al. | 455/575 |
| 2003/0052381 A1 * | 3/2003 | Andoh et al. | 257/433 |
| 2003/0174240 A1 * | 9/2003 | Wada et al. | 348/374 |

(Continued)

FOREIGN PATENT DOCUMENTS

| | | |
|---|---|---|
| JP | 2004-128876 A | 4/2004 |
| JP | 2004-229049 A | 8/2004 |

(Continued)

OTHER PUBLICATIONS

Picture Images of mobile phone with handwritten indication of parts corresponding to present invention as taken from website http://k-tai.impress.co.jp/cda/article/interview/24277.html R. Ohta "Interview with the developers of Vodafone 902T", [online]. K-tai Watch Editorial Dept., Jun. 13, 2005 [as retrieved on Sep. 19, 2008].

*Primary Examiner* — Sinh Tran
*Assistant Examiner* — Jason Flohre
(74) *Attorney, Agent, or Firm* — Edwards Wildman Palmer LLP; David G. Conlin; David A. Tucker

(57) ABSTRACT

A camera apparatus (100) includes: a first housing (1) including a lens section (10); a second housing (2) including an image pickup section (20); and a connecting section (3) which connects the first and second housings (1) and (2). During image pickup, a focal length is specified by a contact between a bottom surface of a lens holder (12) which is exposed in the first housing (1) and a top surface of a transparent cover section (25) which is exposed in the second housing (2). This allows a realization of a camera apparatus in which a focal length is specified with high accuracy.

4 Claims, 6 Drawing Sheets

(56) References Cited

U.S. PATENT DOCUMENTS

| | | | |
|---|---|---|---|
| 2004/0116166 A1* | 6/2004 | Makishima | 455/575.1 |
| 2004/0164981 A1 | 8/2004 | Fujita et al. | |
| 2004/0183935 A1* | 9/2004 | Shimano et al. | 348/335 |
| 2005/0287953 A1* | 12/2005 | Ikeda et al. | 455/66.1 |
| 2007/0267712 A1 | 11/2007 | Fujita et al. | |
| 2008/0277752 A1 | 11/2008 | Fujita et al. | |

FOREIGN PATENT DOCUMENTS

| | | |
|---|---|---|
| JP | 2004-260676 A | 9/2004 |
| JP | 2004-296453 A | 10/2004 |
| JP | 2005-278134 A | 10/2005 |
| JP | 2005-295070 A | 10/2005 |

* cited by examiner

CAMERA APPARATUS AND ELECTRONIC DEVICE PROVIDED WITH THE SAME

TECHNICAL FIELD

The present invention relates to a camera apparatus having a camera function, and to an electronic device, such as a mobile phone, which is provided with the camera apparatus.

BACKGROUND ART

A foldable mobile phone having a camera function is arranged such that a camera module, in which a lens section and an image pickup section are integrated with each other, is incorporated into either (i) a display side housing in which an LCD (a liquid crystal display) is provided or (ii) a housing in which operation buttons are provided. The reason why the camera module is thus incorporated into one of the housings is that it is simple and easy to handle the camera module.

However, a focal length (a distance from a lens provided in the lens section to a solid-state image sensing device provided in the image pickup section) is set in advance to a predetermined one in the camera module. As such, it is impossible to change the focal length. For this reason, when the camera module is incorporated into one of the housings, it is impossible to make a thickness of the one of the housings smaller than the focal length. In view of the circumstances, it is impossible to meet requests for further reduction in thickness of a foldable mobile phone.

In order to meet the requests, Patent Literature 1, for example, discloses a foldable mobile phone in which a lens section and an image pickup section are provided in one and the other of housings, respectively. FIG. 6 is a cross-sectional view illustrating a side surface of the foldable mobile phone of Patent Literature 1.

As illustrated in FIG. 6, a foldable mobile phone 200 includes a housing 201 including an image pickup section 220, a housing 202 including a lens section 210, and a connecting section 203 which foldably connects the housings 201 and 202. The image pickup section 220 and the lens section 210 are arranged so as to overlap each other, during image pickup, while they are being folded.

CITATION LIST

Patent Literature 1

Japanese Patent Application Publication, Tokukai, No. 2004-260676 A (Publication Date: Sep. 16, 2004)

SUMMARY OF INVENTION

Note however that Patent Literature 1 is silent as to how to position the image pickup section 220 and the lens section 210 (how to position the housing 201 and the housing 202) in the foldable mobile phone 200 of FIG. 6. This causes a problem that the foldable mobile phone 200 has a low accuracy in focal length.

Specifically, Patent Literature 1 is based on the premise that the lens section 210 and the image pickup section 220 are accurately positioned during image pickup. Namely, Patent Literature 1 is based on the premise that a specific focal length has been realized during image pickup.

The foldable mobile phone 200 of Patent Literature 1 is arranged such that the housing 202 contains the lens 210 (see paragraph [0061] of Patent Literature 1). For this reason, it is necessary to suitably provide the lens section 210 inside the housing 202 so that the focal length becomes the specific focal length during folding of the mobile phone. Namely, it is necessary to design the housing 202 with high accuracy so that the focal length becomes the specific focal length. According to the foldable mobile phone 200 disclosed in Patent Literature 1, the accuracy in focal length depends on the accuracy in designing a mold for forming the housing 202.

However, it is extremely difficult to form the housing 202 with high accuracy by improving accuracy in designing a mold for forming the housing 202. Namely, it is extremely difficult to realize the specific focal length. This causes the focal length to be out of the specific focal length in the foldable mobile phone 200. This would lead to a blur in the entire picked-up image.

The present invention has been made in view of the problems, and its object is to provide a camera apparatus which has a high accuracy in focal length, and to provide a mobile phone including the camera apparatus.

In order to solve the problems, a camera apparatus of the present invention includes: a first housing including a lens section provided with: a lens which directs external light toward a light-receiving surface of a solid-state image sensing device; and a lens holder which holds the lens inside; a second housing including an image pickup section provided with: the solid-state image sensing device; and a transparent cover section which is provided (i) so as to face the light-receiving surface and (ii) so as to have a gap between the solid-state image sensing device and the transparent cover section; and a connecting section which connects the first and second housings, a bottom surface of the lens holder being exposed in the first housing, and the transparent cover section being exposed in the second housing, a focal length being specified by a contact between the bottom surface of the lens holder and a top surface of the transparent cover section during image pickup.

With the arrangement, the lens holder and the transparent cover section are exposed in the first and second housings, respectively. During image pickup, the focal length (optical length) is specified by the contact between the exposed bottom surface of the lens holder and the exposed top surface of the transparent cover section. For this reason, neither the first housing nor the second housing is involved in specifying the focal length. Namely, unlike the arrangement of Patent Literature 1, the accuracy in a mold for forming a housing which accuracy has a limit to improve an accuracy of design is not involved in specifying the focal length. This allows an improvement in accuracy of focal length. Consequently, it is possible to realize a fixed focal length and to prevent a blur in the entire picked-up image. Furthermore, it is possible to reduce a variation in accuracy of focal lengths of the camera apparatuses housing (mold) since the focal length is specified irrespective of the accuracy in housing (mold).

The camera apparatus of the present invention is preferably arranged such that: the connecting section rotatably or slidably connects the first and second housings; image pickup is carried out while the first and second housings are overlapping each other; and the focal length is specified while the first and second housings are overlapping each other.

According to the invention, the connecting section rotatably or slidably connects the first and second housings. Namely, a camera apparatus thus arranged is a foldable camera apparatus, a rotatable camera apparatus, or a slidable camera apparatus. In each of the camera apparatuses, the focal length is specified while the first and second housings are overlapping each other during image pickup. This allows the focal length to be specified during image pickup with high accuracy.

Furthermore, according to each of the camera apparatuses, it is possible that the first and second housings are provided so as to be flush with each other while image pickup is not performed, instead of realizing a state in which the first and second housings overlap each other. This allows storing a camera apparatus in a slim state while no image pickup is being carried out.

It should be noted here that "a state in which the first and second housings overlap each other" indicates a state in which the first and second housings overlap each other so that the bottom surface of the lens holder and the top surface of the transparent cover section are in surface-to-surface contact with each other.

In a case of a foldable camera apparatus, which is an embodiment of the present invention, the arrangement can be described such that the connecting section rotatably connects the first and second housings, image pickup is carried out in a folded state in which the first and second housings are folded, and the focal length is specified in the folded state.

In such a foldable camera apparatus, image pickup is carried out in the folded state in which the first and second housings are folded. This allows the focal length to be specified with high accuracy during image pickup. Consequently, it is possible to provide a foldable camera apparatus which has a high accuracy in focal length. It should be noted here that the "folded state" indicates the state in which the bottom surface of the lens holder and the top surface of the transparent cover section are in surface-to-surface contact with each other while the first and second housings are being folded.

The camera apparatus of the present invention is preferably arranged such that during image pickup the transparent cover section fits to the lens holder while the bottom surface of the lens holder and the top surface of the transparent cover section are being in contact with each other.

With the arrangement, during image pickup, (i) the bottom surface of the lens holder and the top surface of the transparent cover section are in contact with each other and (ii) the transparent cover section fits to the lens holder. This allows not only the focal length to be specified with high accuracy but also the axes of the lens and the solid-state image sensing device to coincide with each other with high accuracy.

The camera apparatus of the present invention may be arranged such that the image pickup section includes a sealing section, which seals, with a resin, the transparent cover section so that the top surface of the transparent cover section is exposed in the sealing section.

With the arrangement, the image pickup section has a CSP structure since it has the sealing section. This allows a reduction in thickness of the image pickup section. It is thus possible to provide a microminiaturized and microthin camera apparatus.

An electronic device of the present invention includes a camera apparatus as mentioned above.

Since an electronic device of the present invention includes a camera apparatus of the present invention, it is possible to provide the electronic device with a camera function. It is easy to apply the camera apparatus, which has been made thinner, to an electronic device. Namely, such an electronic device has degrees of freedom of incorporating of the camera apparatus. This allows miniaturizing and multifunctionalizing of the electronic device, and it is therefore possible to meet users' needs.

An electronic device of the present invention is not particularly limited, provided that the electronic device has a camera function provided by a camera apparatus of the present invention. A mobile phone, a mobile terminal, a mobile dictionary, and a mobile game machine exemplify the electronic device.

For a fuller understanding of the nature and advantages of the invention, reference should be made to the ensuing detailed description taken in conjunction with the accompanying drawings.

REFERENCE SIGNS LIST

Figure 1:
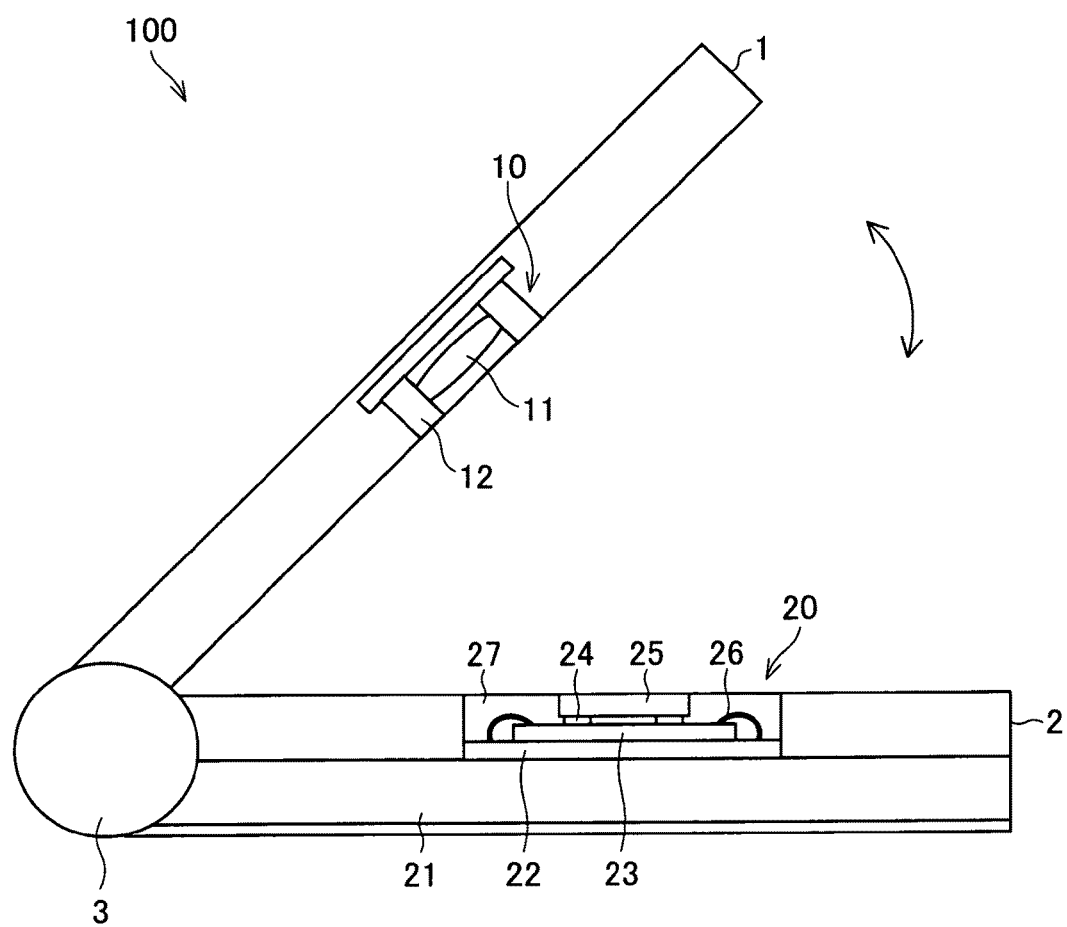
FIG. 1 is a cross-sectional view illustrating a side surface of a camera apparatus according to an embodiment of the present invention.

1 First housing
2 Second housing
3 Connecting section
10 Lens section
11 Lens
12 Lens holder
20 Image pickup section
21 Housing base substrate
22 Wiring substrate
23 Solid-state image sensing device
24 Adhering section
25 Transparent cover section
26 Wire
27 Sealing section
28 Buffering member
30 Lens section
40 Image pickup section
100 Camera apparatus
110 Camera apparatus

DESCRIPTION OF EMBODIMENTS

An embodiment of the present invention is described below with reference to the attached drawings.

FIG. 1 is a cross-sectional view illustrating a side surface of a camera apparatus 100 in accordance with an embodiment of the present invention. The camera apparatus 100 includes a first housing 1 including a lens section 10, a second housing 2 including an image pickup section 20, and a connecting section 3 which connects the first and second housings 1 and 2. The camera apparatus 100 is arranged to function as a camera while the first and second housings 1 and 2 are being folded by rotating around the connecting section 3 serving as their rotation axis.

The first housing 1 includes the lens section 10 at its center part. The lens section 10 is an imaging optical system (optical structure) for forming a subject image. The lens section 10 is constituted by a lens 11 for forming an image in the image pickup section 20 and a lens holder 12 which holds the lens 11.

The lens holder 12 is a frame member for holding (supporting) the lens 11 inside, and the lens 11 is provided in an upper central part of the lens holder 12. The lens holder 12 holds the lens 11 so that an optical axis of the lens 11 coincides with an axis of the lens holder 12. The lens holder 12 also serves as a member which causes the lens section 10 to be suitably provided above the image pickup section 20.

Furthermore, the lens holder 12 is a hollow (tubular) member and holds the lens 11 inside. This allows securement of an optical path extending from the lens 11 to a solid-state image sensing device 23 (described later). Moreover, a characteristic technical feature of the lens holder 12 is to be described later.

On the other hand, the second housing 2 includes a housing base substrate 21 and the image pickup section 20 provided on the housing base substrate 21. The image pickup section 20 converts a subject image formed by the lens section 10 into an electrical signal. Namely, the image pickup section 20 is a sensor device for carrying out photoelectric conversion with respect to light received from the lens section 10.

The image pickup section 20 includes the solid-state image sensing device 23, an adhering section 24, and a transparent cover section 25, which are stacked on a wiring substrate 22 in this order. Wires 26 electrically connect the wiring substrate 22 and the solid-state image sensing device 23. The image pickup section 20 is arranged such that a sealing section 27 made of mold resin integrates and seals the members which are provided on the wiring substrate 22. Thus, the image pickup section 20 has a CSP (Chip Scale Package) structure. This allows the second housing 2 to be smaller in thickness than an arrangement of a non-CSP structure (e.g. the arrangement of Patent Literature 1). This is because the mold resin of the CSP structure can further strengthen the second housing 2, thereby allowing the wiring substrate 22 to become thinner. On the other hand, in a case where the image pickup section 20 does not employ the CSP structure, if the wiring substrate 22 is made thinner, then the wiring substrate 22 may be broken during the manufacturing process and/or there may occur a problem after the camera apparatus 100 has been shipped as a product. This would lead to lower reliability. For example, in the case of the CSP structure, it is possible to reduce a thickness of the wiring substrate 22 to about 0.135 mm. On the other hand, in the case of the non-CSP structure, it is necessary that the wiring substrate 22 has a thickness of about 0.5 mm. Further, the CSP structure is less likely to vary in thickness, and it is thus possible to increase a margin for designing the second housing 2. This allows a reduction in costs of manufacturing the second housing 2.

The wiring substrate 22 is a substrate to which wiring is patterned. A printed board or a ceramic substrate exemplifies the wiring substrate 22.

The solid-state image sensing device 23 is, for example, a CCD or a CMOS sensor IC. The solid-state sensing device 23 has a surface (top) on which a light-receiving surface, where a plurality of pixels are arranged in a matrix pattern, is provided. The light-receiving surface is an area (a light transmission area) through which light received from the lens section 10 is transmitted, and the light-receiving surface can be referred to as a pixel area. The image pickup section 20 has an image pickup surface, and actually, the image pickup surface is the light-receiving surface (pixel area).

The solid-state image sensing device 23 converts a subject image formed on the light-receiving surface (pixel area) into an electric signal, and supplies the electric signal as an analogue image signal. Namely, the photoelectric conversion is carried out by the light-receiving surface. A DSP (not illustrated) controls the solid-state image sensing device 23, and processes an image signal generated by the solid-state image sensing device 23.

The adhering section 24 is provided around the light-receiving surface of the solid-state image sensing device 23. The adhering section 24 adheres the transparent cover section 25 on the solid-state image sensing device 23. This causes the light-receiving surface of the solid-state image sensing device 23 and the transparent cover section 25 to be provided to face each other. Namely, the transparent cover section 25 covers the light-receiving surface of the solid-state image sensing device 23.

The adhering section 24 is provided so as to surround an outer circumferential part of the light-receiving surface of the solid-state image sensing device 23. This causes the adhering section 24 to adhere the transparent cover section 25 to the light-receiving surface of the solid-state image sensing device 23 while the light-receiving surface of the solid-state image sensing device 23 and the transparent cover section 25 are facing each other. During the adhering, a space (gap) S is secured between the solid-state image sensing device 23 and the transparent cover section 25. Sealing of the space S in this way allows (i) prevention of penetration of humidity and (ii) prevention of penetration and attachment of dust to the light-receiving surface. It is thus possible to prevent occurrence of defectives on the light-receiving surface.

The adhering section 24 is, for example, realized (i) by adhering a sheet adhesive on the solid-state image sensing device 23, and thereafter (ii) by carrying out patterning process in which processes, such as exposure and development, are carried out by use of photolithography technique. The photolithography technique allows the patterning of the adhering section 24 to be carried out with high accuracy. Furthermore, the sheet adhesive allows the adhering section 24 to have a uniform thickness. This allows the transparent cover section 25 to be adhered, with high accuracy, to the light-receiving surface of the solid-state image sensing device 23.

The transparent cover section 25 is made of a transparent member such as glass. In the present embodiment, the transparent cover section 25 is coated with an infrared cut film (IR cut filter). This allows prevention of infrared rays from entering into the solid-state image sensing device 23.

Figure 5:
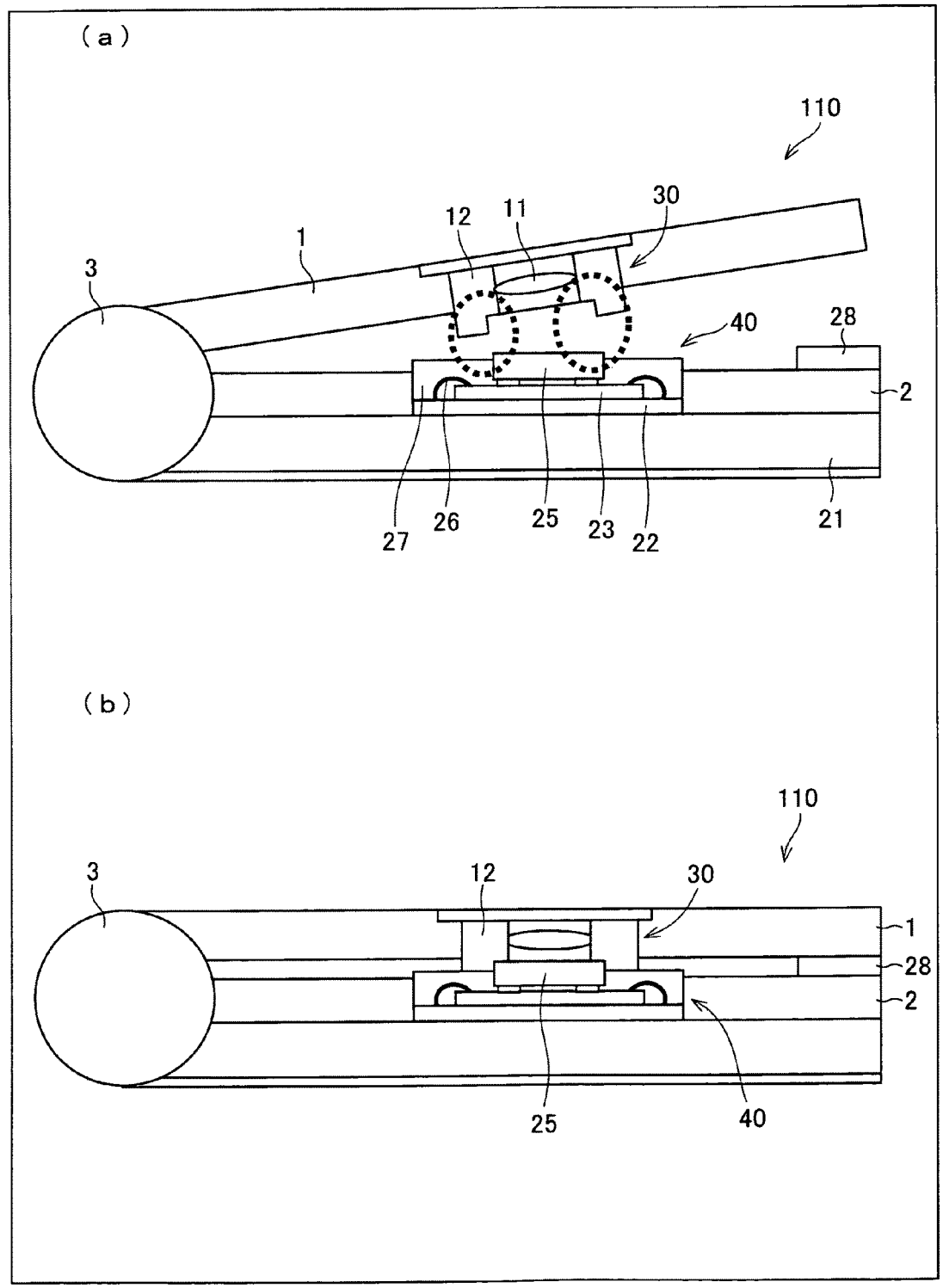
FIG. 5 (a) and (b) of FIG. 5 are cross-sectional views of a side surface of a camera apparatus according to another embodiment of the present invention. (a) of FIG. 5 illustrates the camera apparatus in the folded state. (b) of FIG. 5 illustrates the camera apparatus which is being unfolded.
Figure 6:
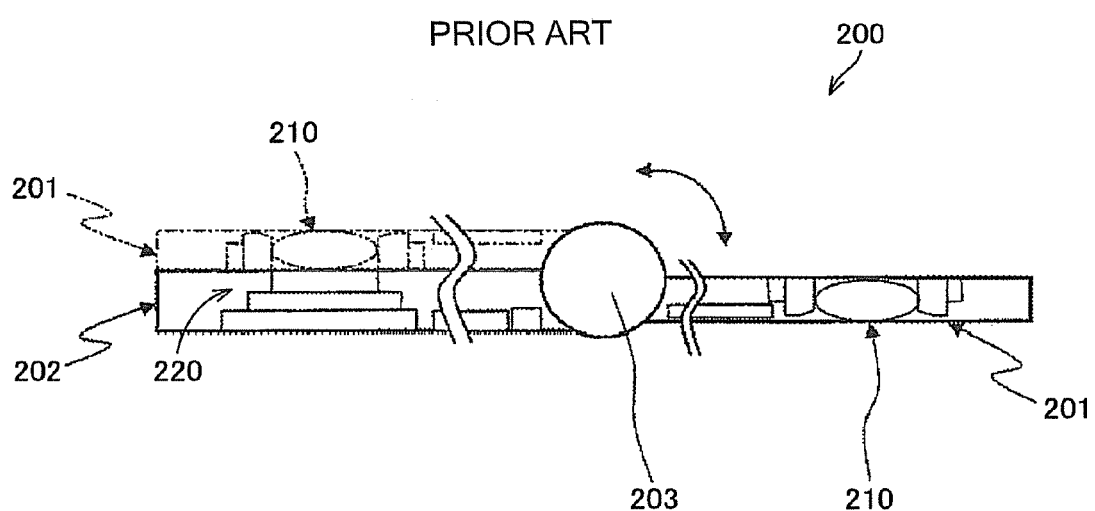
FIG. 6 is a cross-sectional view illustrating a side surface of a camera apparatus disclosed in Patent Literature 1.

The sealing section 27 seals, with mold resin (sealing resin), and fixes the members which are stacked on the wiring substrate 22. The sealing section 27 seals the members, which are stacked on the wiring substrate 22, so as to keep away from the light transmission area of the camera apparatus 100. This causes a surface (top) of the transparent cover section 25 to be exposed in the image pickup section 20 instead of being sealed by the sealing section 27, as illustrated in FIG. 5. This allows a transmission of light to the light-receiving surface of the solid-state image sensing device 23 through the transparent cover section 25.

Note that the image pickup section 20 includes the DSP (digital signal processor) (not illustrated). The image pickup section 20 controls the solid-state image sensing device 23, and carries out a process with respect to a signal supplied from the solid-state image sensing device 23. Note also that the wiring substrate 22 can be arranged so as to include electronic components, such as (i) a CPU which carries out various arithmetic processes in accordance with a program, (ii) a ROM in which the program is stored, and (iii) a RAM in which data and the like used and found in each of the processes are stored, the electronic components controlling the entire camera apparatus 100.

Further, the camera apparatus 100 can be arranged to include a liquid crystal display section so that an image is picked up while the image to be picked up is being checked. In this case, it is preferable that the liquid crystal display section be provided on a surface opposite to the surface on which the transparent cover section 25 is provided.

The following describes image pickup operation by use of the camera apparatus 100. As is described earlier, the camera apparatus 100 is arranged such that the lens section 10 and the image pickup section 20 are provided in respective different housings (the first and second housings 1 and 2). Furthermore, the connecting section 3 rotatably connects the first and second housings 1 and 2. This allows the first and second housings 1 and 2 to rotate around the connecting section 3, in the camera apparatus 100. Namely, the camera apparatus 100 is arranged to be foldable.

Figure 2:
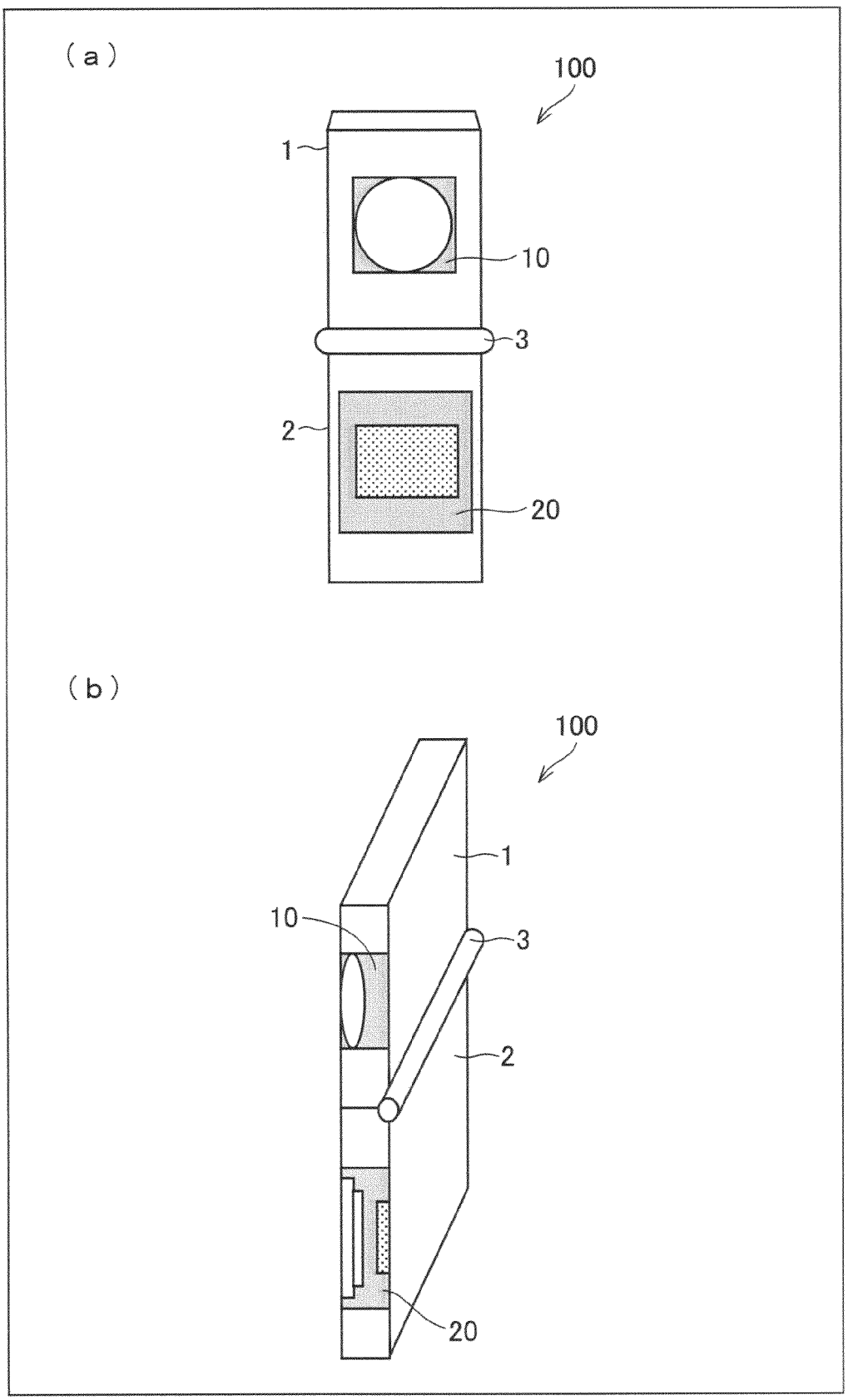
FIG. 2 Each of (a) and 2 (b) of FIG. 2 illustrates the camera apparatus of FIG. 1. (a) of FIG. 2 is a top view of the camera apparatus of FIG. 1 in an unfolded state. (b) of FIG. 2 is a side view of the camera apparatus of FIG. 1 in the unfolded state.
Figure 3:
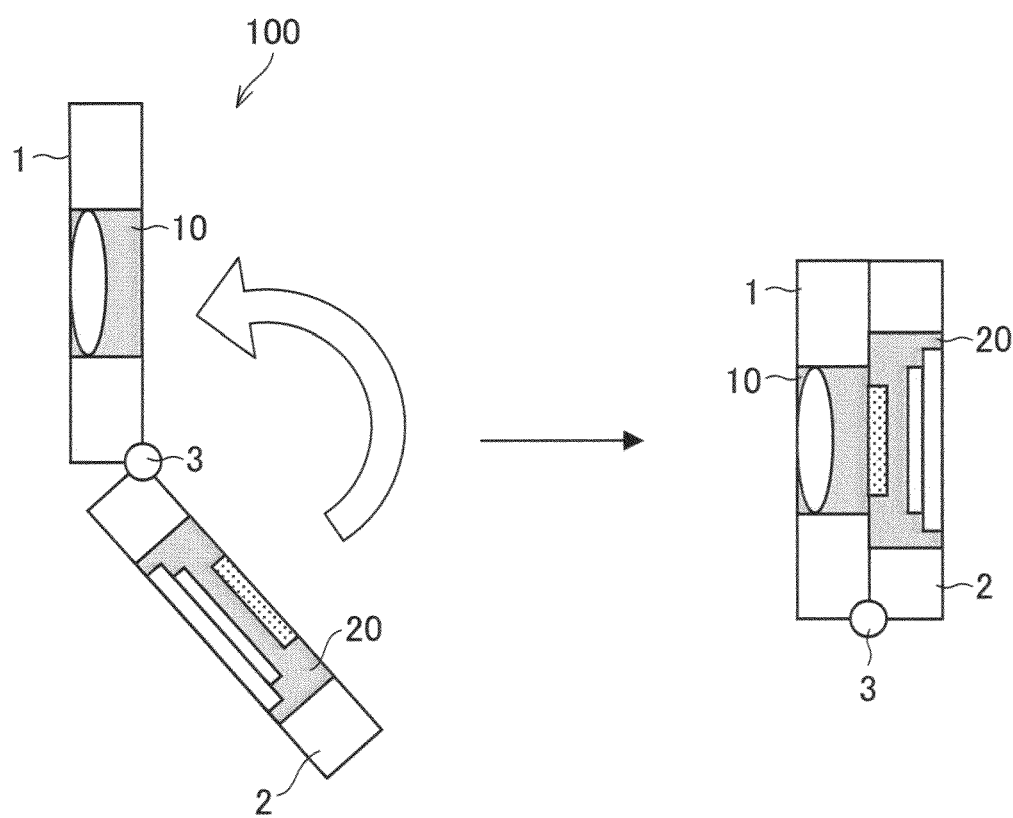
FIG. 3 is a side view of the camera apparatus of FIG. 1 in a folded state.

According to the camera apparatus 100, the first and second housings 1 and 2 are in an "unfolded state" when image pickup is not carried out, whereas the first and second housings 1 and 2 are in a "folded state" during image pickup. (a) of FIG. 2 is a top view of the camera apparatus 100 in the unfolded state. (b) of FIG. 2 is a side view of the camera apparatus 100 in the unfolded state; FIG. 3 is a side view of the camera apparatus 100 in the folded state.

As illustrated in (a) and (b) of FIG. 2, the camera apparatus 100 is in the "unfolded state" when image pickup is not carried out (while the camera apparatus is being carried or stored). In the camera apparatus 100 of the present embodiment, the "unfolded state" indicates a state in which the first and second housings 1 and 2 are flush with each other. This allows storing of the camera apparatus 100 in a slim state while image pickup is not carried out. It is thus possible to put the camera apparatus 100 even in a wallet or a pass case. This is convenient for the holder.

On the other hand, as illustrated in FIG. 3, the first and second housings 1 and 2 are folded during image pickup so that the camera apparatus 100 is in the "folded state". In the camera apparatus 100 of the present embodiment, the "folded state" indicates a state in which the first and second housings 1 and 2 are in contact with each other. More specifically, in a case where it is assumed that (i) a rear surface of the first housing 1 is a surface on a bottom surface side of a lens holder 12 (see FIG. 1) which is to be brought into contact with the second housing 2 and (ii) a top surface of the second housing 2 is a surface on a side where the transparent cover section 25 (see FIG. 1) is provided, the "folded state" indicates a state in which the rear surface of the first housing 1 (bottom surface of the lens section 10) and the top surface of the second housing 2 (top surface of the transparent cover section 25) are in contact with other.

It should be noted that a focal length (a distance from a center of the lens 11 to the light-receiving surface of the solid-state image sensing device 23) is fixed in the folded state of the camera apparatus 100. Namely, according to the camera apparatus 100, the distance (focal length) from the lens section 10 to the image pickup section 20) is specified with high accuracy during the image pickup (see (a) of FIG. 4). Note that the lens section 10 and the image pickup section 20 are parallel to each other. Note also that optical axes of the lens section 10 and the image pickup section 20 are arranged so as to substantially coincide with each other.

Figure 4:
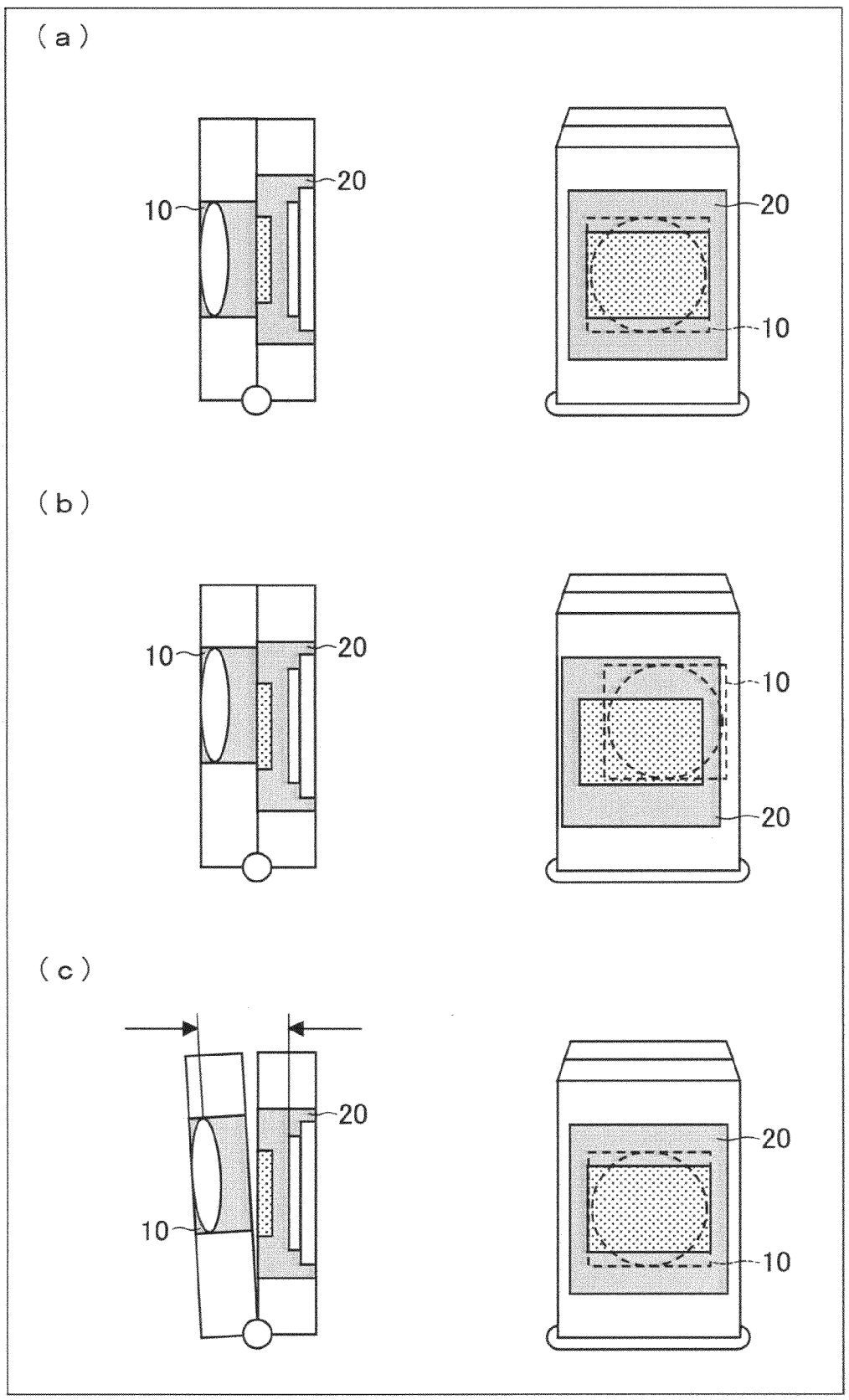
FIG. 4 (a) through (c) of FIG. 4 are cross-sectional views and top views of a side surface of the camera apparatus of FIG. 1. (a) of FIG. 4 illustrates the camera apparatus of FIG. 1 which is in a state in which a displacement does not occur. (b) of FIG. 4 illustrates the camera apparatus of FIG. 1 which is in a state in which a displacement occurs, in surface directions, between a lens section and an image pickup section (c) of FIG. 4 illustrates the camera apparatus of FIG. 1 which is in a state in which a focal length is no longer a specified focal length.

When repeated folding and unfolding of the camera apparatus 100 cause the focal length to vary and/or prevent the optical axes of the lens section 10 and the image pickup section 20 from coinciding with each other, a picked-up image is adversely affected. Each of (b) and (c) of FIG. 4 illustrates how a picked-up image is adversely affected. In each of (b) and (c) of FIG. 4, a cross-sectional view and a top view of a side surface of the camera apparatus of FIG. 1 are illustrated. Specifically, (b) of FIG. 4 illustrates the camera apparatus which is in a state in which a displacement occurs, in surface directions, between the lens section 10 and the image pickup section 20 (their optical axes do not coincide with each other). (c) of FIG. 4 illustrates the camera apparatus which is in a state in which a focal length is no longer a specified focal length.

Specifically, in a case where a displacement occurs, in surface directions (horizontal direction, x-y direction), between the lens section 10 and the image pickup section 20 (see (b) of FIG. 4), the lens section 10 and the image pickup section 20 are parallel to each other during image pickup in a similar manner to the normal case (see (a) of FIG. 4) in which no displacement occurs. For this reason, the focal length is not affected by the displacement that occurred between the lens section 10 and the image pickup section 20. However, the optical axes of the lens section 10 and the image pickup section 20 do not coincide with each other. This prevents a picked-up image from being centered or this causes one side of the picked-up image to darken or blur.

On the other hand, in a case where a displacement occurs in optical axis directions (height direction, z direction) between the lens section 10 and the image pickup section 20 (see (c) of FIG. 4), the lens section 10 and the image pickup section 20 are no longer parallel to each other during image pickup. This causes a distance from the center of the lens section 10 to the image pickup section 20 to vary. As a result, the focal length is no longer the specified focal length, thereby blurring the entire picked-up image.

In view of the circumstances, the camera apparatus 100 includes the following characteristic technical feature so as to improve an accuracy in focal length during image pickup (in the folded state). Specifically, the camera apparatus 100 is arranged such that the bottom surface of the lens holder 12 is exposed in the rear surface of the first housing 1, and the transparent cover section 25 is exposed in the top surface of the second housing 2. Furthermore, the rear surface of the first housing 1 and the exposed bottom surface of the lens holder 12 are flush with each other, and the surface of the second housing 2 and the exposed transparent cover section 25 are flush with each other. The bottom surface of the lens holder 12 and the top surface of the transparent cover section 25 are arranged so as to be in contact with each other during image pickup. This causes the focal length to be specified. For this reason, neither the first housing 1 nor the second housing 2 is involved in specifying the focal length. Namely, the accuracy in a mold, for forming a housing which has a limit to improve an accuracy of design, is not involved in specifying the focal length. This allows the optical axes of the lens section 10 and the image pickup section 20 to coincide with each other as illustrated in (a) of FIG. 4 while the focal length is being the specified focal length during image pickup. It is thus possible to improve in accuracy of focal length. Namely, since it is possible that the lens section 10 has a fixed focal length, it is possible to prevent a blur in the entire picked-up image.

The camera apparatus 100 is preferably arranged such that, in the folded state (during image pickup), (i) the bottom surface of the lens holder 12 and the top surface of the transparent cover section 25 (or the sealing section 27) are in contact with each other and (ii) the transparent cover section 25 (or the sealing section 27) is fit to the lens holder 12. This causes the optical axes of the lens holder 12 and the transparent cover section 25 to securely coincide with each other in the folded state. This allows prevention of displacement that occurred in the surface directions in the folded state between the first and second housings 1 and 2. It is thus possible that (i) the lens section 10 has a fixed focal length with high accuracy and (ii) the optical axes of the lens 11 and the solid-state image sensing device 23 coincide with each other with high accuracy.

Specifically, (a) and (b) of FIG. 5 are cross-sectional views of a side surface of a camera apparatus 110 in which the transparent cover section 25 is fit to the lens holder 12. (a) of FIG. 5 illustrates the cameral apparatus 110 in a folded state. (b) of FIG. 5 illustrates the camera apparatus 110 which is being unfolded.

According to the camera apparatus 100 (see FIG. 1), a bottom part of the lens holder 12 and the bottom surface of the first housing 1 are flush with each other, and the transparent cover section 25, the sealing section 27, and the surface of the second housing 2 are flush with each other.

On the other hand, the camera apparatus 110 is arranged such that (i) the focal length is securely specified in broken line areas in (a) of FIG. 5 and (ii) optical axes of a lens section 30 and an image pickup section 40 securely coincide with each other. Specifically, the bottom part of the lens holder 12 projects from the first housing 1 toward the second housing 2. Further, parts of the transparent cover section 25 and the sealing section 27 also project from the second housing 2 toward the first housing 1. The transparent cover section 25 projects more toward the first housing 1 than the sealing section 27. The lens holder 12 has a projecting part whose inner diameter is larger than that of its part for holding the lens 11. This causes the projecting part of the lens holder 12 to be fit to an outer circumferential part of the transparent cover section 25 in the folded state (see (b) of FIG. 5). As a result, the optical axes of the lens holder 12 and the transparent cover section 25 securely coincide with each other in the folded state (see (b) of FIG. 5). This allows prevention of a displacement that occurred in the surface directions in the folded state between the first and second housings 1 and 2. It is thus possible that (i) the lens section 10 has a fixed focal length with high accuracy and (ii) the optical axes of the lens 11 and the solid-state image sensing device 23 coincide with each other with high accuracy.

As mentioned above, according to the camera apparatus 110, the lens holder 12 is fit to the transparent cover section 25 so that (i) a displacement between the housings is prevented and (ii) the optical axes of the lens section and the image pickup section coincide with each other. However, it is also possible to achieve a similar effect to the above even in a case where such an arrangement, in which (i) the displacement between the housings is prevented and (ii) the optical axes (e.g. a projection and an opening corresponding to the projection) coincide with each other, is provided in each of the first and second housings 1 and 2.

Note that a buffering member (cushion) 28 is provided on a surface of the second housing 2 which surface faces the first housing 1. The buffering member 28 is brought into contact with each of the first and second housings 1 and 2 in the folded state. This allows cushioning an impact applied to each of the lens section 30 and the image pickup section 40 in the folded state.

It is preferable that the buffering member 28 be made of a light blocking material. This allows the buffering member 28 to block light which externally enters into the solid-state image sensing device 23 and which is unnecessary for image pickup.

As is described earlier, the camera apparatus 100 in which the positioning of the housings in a folded state (during image pickup) is carried out by the lens section 10 and the image pickup section 20, which are exposed in the first and second housings 1 and 2, respectively. This causes the focal length to be specified irrespective of the accuracy of design for the first and second housings 1 and 2. It is thus possible to realize a highly accurate focal length.

The present embodiment describes the foldable camera apparatus 100 in which the connecting section 3 rotates the first and second housings 1 and 2. However, a model (type) of a camera apparatus is not limited to this, provided that: the connecting section 3 rotatably or slidably connects the first and second housings 1 and 2; image pickup is carried out while the first and second housings 1 and 2 are overlapping each other; and the focal length is specified while the first and second housings 1 and 2 are overlapping each other. Namely, a camera apparatus can be a rotatable camera apparatus or a slidable camera apparatus, other than a foldable camera apparatus. Also in each of the camera apparatuses, the focal length is specified while the first and second housings 1 and 2 are overlapping each other during image pickup. This allows the focal length to be specified during image pickup with high accuracy.

Furthermore, according to each of the camera apparatuses, it is possible that the first and second housings 1 and 2 are provided so as to be flush with each other while image pickup is not performed, instead of realizing a state in which the first and second housings 1 and 2 overlap each other. This allows storing a camera apparatus in a slim state while no image pickup is being carried out.

It should be noted here that "a state in which the first and second housings 1 and 2 overlap each other" indicates a state in which the first and second housings 1 and 2 overlap each other so that the bottom surface of the lens holder 12 and the top surface of the transparent cover section 25 are in surface-to-surface contact with each other.

A slidable camera apparatus can be arranged such that, as in the foregoing folded state, the connecting section 3 connects the first and second housings 1 and 2 so that they can move parallel while the lens section 10 and the image pickup section 20 are staying in parallel to each other.

Moreover, the present embodiment describes the camera apparatus including 1 (one) set of the lens section 10 and the image pickup section 20. The present embodiment, however, is not limited to this. Alternatively, the camera apparatus can be a camera apparatus (e.g. a twin-camera apparatus) having plural (two or more) sets of the lens section 10 and the image pickup section 20.

Further, the present embodiment describes the camera apparatus having a camera function only. The present embodiment, however, is not limited to this. Alternatively, it is possible to provide an electronic device with a camera function, by applying the camera apparatus 100 to the electronic device (e.g., a mobile phone, a mobile dictionary, a mobile game machine, a mobile terminal, or the like). It is easy to apply the camera apparatus 100, which has been made thinner, to an electronic device. Namely, such an electronic device has degrees of freedom of incorporating of the camera apparatus 100. This allows miniaturizing and multifunctionalizing of the electronic device, and it is therefore possible to meet users' needs.

The present invention is not limited to the description of the embodiments above, but may be altered by a skilled person within the scope of the claims. An embodiment based on a proper combination of technical means disclosed in different embodiments is encompassed in the technical scope of the present invention.

As mentioned above, a camera apparatus of the present invention is arranged such that: the bottom surface of the lens holder is exposed in the first housing, and the transparent cover section is exposed in the second housing; and the focal length is specified by the contact between the bottom surface of the lens holder and the top surface of the transparent cover section during image pickup. For this reason, neither the first housing nor the second housing is involved in specifying the focal length. This allows providing a camera apparatus which has a high accuracy in focal length.

The embodiments and concrete examples of implementation discussed in the aforementioned detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A camera apparatus of the present invention is applicable to an electronic device, such as a mobile phone, a mobile dictionary, a mobile game machine, or a mobile terminal, and can provide such an electronic device with a camera function.

The invention claimed is:

1. A camera apparatus comprising:
a first housing including a lens section provided with: a lens which directs external light toward a light-receiving surface of a solid-state image sensing device; and a lens holder which holds the lens inside;
a second housing including an image pickup section provided with: the solid-state image sensing device; and a transparent cover section which is provided (i) so as to face the light-receiving surface and (ii) so as to have a gap between the solid-state image sensing device and the transparent cover section; and
a connecting section which connects the first and second housings;
wherein:
a bottom surface of the lens holder is exposed in the first housing;
the transparent cover section is exposed in the second housing;
a focal length is specified by a contact between the bottom surface of the lens holder and a top surface of the transparent cover section during image pickup;
the second housing includes a buffering member on its surface which faces the first housing;
the buffering member and the first housing are brought into contact with each other during image pickup; and
the buffering member is made of a light blocking material such that light that enters into the solid-state image sensing device from an outside of the camera apparatus and which is unnecessary for image pickup is blocked: and
wherein:
the connecting section rotatably or slidably connects the first and second housings;
image pickup is carried out while the first and second housings are overlapping each other;
the focal length is specified while the first and second housings are overlapping each other;
the image pickup section includes a sealing section, which seals, with a resin, the transparent cover section so that the top surface of the transparent cover section is exposed in the sealing section;
a bottom part of the lens holder projects from the first housing toward the second housing, parts of the transparent cover section and the sealing section project from the second housing toward the first housing, and the transparent cover section projects more toward the first housing than the sealing section; and
during image pickup a projecting part of the lens holder is fit to an outer circumferential part of the transparent cover section while the bottom surface of the lens holder and the top surface of the transparent cover section are in contact with each other, whereby (i) optical axes of the lens and the solid-state sensing device coincide with each other and (ii) displacement between the first and second housings in surface directions is prevented.

2. The camera apparatus as set forth in claim 1, wherein a space between the solid-state image sensing device and the transparent cover section is sealed.

3. The camera apparatus as set forth in claim 1, wherein the second housing includes, on its rear surface, a display section which displays an image picked up by the image pickup section.

4. An electronic device comprising a camera apparatus, the camera apparatus comprising:
a first housing including a lens section provided with: a lens which directs external light toward a light-receiving surface of a solid-state image sensing device; and a lens holder which holds the lens inside;
a second housing including an image pickup section provided with: the solid-state image sensing device; and a transparent cover section which is provided (i) so as to face the light-receiving surface and (ii) so as to have a gap between the solid-state image sensing device and the transparent cover section; and
a connecting section which connects the first and second housings;
wherein:
a bottom surface of the lens holder is exposed in the first housing;
the transparent cover section is exposed in the second housing;
a focal length is specified by a contact between the bottom surface of the lens holder and a top surface of the transparent cover section during image pickup;
the second housing includes a buffering member on its surface which faces the first housing;
the buffering member and the first housing are brought into contact with each other during image pickup; and
the buffering member is made of a light blocking material such that light that enters into the solid-state image sensing device from an outside of the camera apparatus and which is unnecessary for image pickup is blocked: and
wherein:
the connecting section rotatably or slidably connects the first and second housings;
image pickup is carried out while the first and second housings are overlapping each other;

the focal length is specified while the first and second housings are overlapping each other;

the image pickup section includes a sealing section, which seals, with a resin, the transparent cover section so that the top surface of the transparent cover section is exposed in the sealing section;

a bottom part of the lens holder projects from the first housing toward the second housing, parts of the transparent cover section and the sealing section project from the second housing toward the first housing, and the transparent cover section projects more toward the first housing than the sealing section; and during image pickup a projecting part of the lens holder is fit to an outer circumferential part of the transparent cover section while the bottom surface of the lens holder and the top surface of the transparent cover section are in contact with each other, whereby (i) optical axes of the lens and the solid-state image sensing device coincide with each other and (ii) displacement between the first and second housings in surface directions is prevented.

* * * * *